United States Patent
Simileysky et al.

(10) Patent No.: US 12,317,131 B2
(45) Date of Patent: May 27, 2025

(54) MULTI-PROTOCOL COMMUNICATION NETWORK

(71) Applicant: Cypress Semiconductor Corporation, San Jose, CA (US)

(72) Inventors: Victor Simileysky, San Jose, CA (US); Kiran Uln, Pleasanton, CA (US); Saishankar Nandagopalan, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/594,983

(22) Filed: Mar. 4, 2024

(65) Prior Publication Data
US 2024/0251290 A1  Jul. 25, 2024

Related U.S. Application Data

(63) Continuation of application No. 17/485,182, filed on Sep. 24, 2021, now Pat. No. 11,943,658.

(60) Provisional application No. 63/109,122, filed on Nov. 3, 2020.

(51) Int. Cl.
| | |
|---|---|
| H04W 28/06 | (2009.01) |
| H04L 12/40 | (2006.01) |
| H04W 56/00 | (2009.01) |
| H04W 76/10 | (2018.01) |
| H04W 76/25 | (2018.01) |

(52) U.S. Cl.
CPC ........... *H04W 28/065* (2013.01); *H04L 12/40* (2013.01); *H04W 76/10* (2018.02); *H04W 76/25* (2018.02)

(58) Field of Classification Search
CPC ... H04W 28/065; H04W 76/10; H04W 76/25; H04W 56/002; H04L 12/40; H04L 12/40071; H04L 9/3234
See application file for complete search history.

(56) References Cited

U.S. PATENT DOCUMENTS

| | | | | |
|---|---|---|---|---|
| 7,042,903 | B2 * | 5/2006 | Coulier | G06K 19/07 710/65 |
| 7,286,502 | B1 * | 10/2007 | Rao | G06F 3/023 370/328 |
| 2001/0047475 | A1 * | 11/2001 | Terasaki | G06F 21/606 713/168 |

(Continued)

*Primary Examiner* — Jenee Holland

(57) ABSTRACT

A multi-protocol network and methods for operating the same are provided. The method begins with establishing a wireless-connection between a first transceiver in a first device and a second-transceiver in a second device using a wireless-protocol. First, wired-protocol packets and non-packet data are received and converted in the first device to second-packets compatible with the wireless-protocol by inserting synchronization-bits non-packet data in a preamble. This is initiated by sensing arrival of the preamble without waiting for a start of data. The second-packets are transmitted from the first transceiver to the second, and converted to third-packets compatible with the wired-protocol by removing the synchronization-bits. Latency is improved by initiating/starting a packet to the wired controller before a data portion of the packet is received. The number of synchronization bits is selected so the second-packets are aligned and synchronized with wireless-protocol packets.

12 Claims, 4 Drawing Sheets

(56) References Cited

U.S. PATENT DOCUMENTS

| | | | |
|---|---|---|---|
| 2002/0087755 A1* | 7/2002 | Lueker | G06F 5/00 |
| | | | 710/60 |
| 2002/0167932 A1* | 11/2002 | McGowan | H04L 12/4633 |
| | | | 370/349 |
| 2003/0043771 A1* | 3/2003 | Mizutani | H04W 76/10 |
| | | | 370/328 |
| 2004/0027167 A1* | 2/2004 | Mizumoto | H03M 9/00 |
| | | | 326/93 |
| 2005/0210167 A1* | 9/2005 | Kamphausen | G06F 13/4027 |
| | | | 710/62 |
| 2006/0133454 A1* | 6/2006 | Beckwith | H04W 92/18 |
| | | | 375/140 |
| 2007/0030035 A1* | 2/2007 | Komatsu | G06F 1/3203 |
| | | | 327/65 |
| 2008/0117952 A1* | 5/2008 | Jordan | H04B 1/707 |
| | | | 375/360 |
| 2010/0293435 A1* | 11/2010 | Chang | H04L 1/1854 |
| | | | 370/389 |
| 2011/0004920 A1* | 1/2011 | Ejima | H04W 12/068 |
| | | | 726/3 |
| 2011/0013702 A1* | 1/2011 | Fujita | H04N 21/23611 |
| | | | 375/240.26 |
| 2011/0016267 A1* | 1/2011 | Lee | G06F 13/28 |
| | | | 710/24 |
| 2011/0022769 A1* | 1/2011 | Hung | G06F 13/102 |
| | | | 710/313 |
| 2015/0180688 A1* | 6/2015 | Li | H04L 5/1453 |
| | | | 381/77 |
| 2015/0229791 A1* | 8/2015 | Scaff | G06F 3/1293 |
| | | | 358/1.15 |
| 2016/0360045 A1* | 12/2016 | Doyle, Sr. | H04N 1/00323 |
| 2017/0249278 A1* | 8/2017 | Hays | G06F 13/4213 |
| 2018/0173666 A1* | 6/2018 | Srivastava | G06F 13/4027 |
| 2018/0212796 A1* | 7/2018 | Kamihara | G06F 1/06 |
| 2019/0207744 A1* | 7/2019 | Reinhardt | H04L 12/40 |
| 2020/0195724 A1* | 6/2020 | Sugawara | A61B 5/0024 |
| 2021/0157757 A1* | 5/2021 | Tseng | G06F 13/4282 |
| 2022/0070018 A1* | 3/2022 | Paleti | H04L 12/403 |
| 2022/0109575 A1* | 4/2022 | Kapinos | H04L 9/3247 |

* cited by examiner

502

Establishing a wireless connection between a first device including a first-transceiver and a first interface controller coupled to a first-wired connection, and a second-device including a second-transceiver and a second interface controller coupled to a second-wired connection using a packet-switched wireless protocol

504

Receiving from the first-wired connection data including first-packets and non-packet based data to be transmitted through the wireless connection

506

Converting the first-packets to second-packets compatible with the packet-switched wireless protocol by proactively starting a preamble transmission and inserting a number of synchronization bits in a preamble field of the first-packets

508

Transmitting the second-packets from the first-device to the second device

510

Converting the second-packets received in the second-device to third-packets by removing the number of synchronization bits in the preamble field of the second-packets, and coupling the third-packets to the second wired connection through the second-interface controller

512

Exchanging RF packets of accumulated non-packet based data between the first and second transceiver maintain or 'keep alive' the wireless connection while packet based data is not being exchanged

FIG. 5

MULTI-PROTOCOL COMMUNICATION NETWORK

CROSS-REFERENCE TO RELATED APPLICATIONS

This application is claims the benefit of priority under 35 U.S.C. 119 (e) to U.S. Non-Provisional patent application Ser. No. 17/845,182, filed Sep. 24, 2021, and to U.S. Provisional Patent Application Ser. No. 63/109,122, filed Nov. 3, 2020, both of which are incorporated by reference herein in their entirety.

TECHNICAL FIELD

This disclosure relates generally to computer networks, and more particularly to wireless multi-protocol networks including both Universal Serial Bus (USB) and non-USB protocols and control methodology for operating the same.

BACKGROUND

Multi-protocol wired communication networks including both packet based protocols, such as a Universal Serial Bus (USB) protocol, and various other non-USB communication protocols, including, but not limited to Universal Asynchronous Receiver-Transmitter (UART) and Pulse-code Modulation (PCM) have been used to connect various electronic devices and peripherals, and other electronic devices, such as smartphones, tablets, and computers. Furthermore, there many situations in which wired-connections are in not practical, and consequently, a wireless protocol is preferred. In many of these applications it is advantageous to connect the devices to a wireless radio frequency (RF) hub using a USB interface.

However, the communication of data between devices using multiple different wired communication protocols in addition to USB, i.e., a multi-protocol communication network and a RF hub using a USB interface has proven challenging for number of reasons. Firstly, the non-USB, baud rate data must be accumulated, generally in a buffer in the RF hub, to synchronize with USB packets compatible with the RF link. Secondly and more fundamentally, is that latency requirements of the USB standards demand that when a USB packet is presented to the RF hub, it shall start transmission immediately. This effectively prohibits the same RF hub/RF link to be utilized for both USB and non-USB traffic, since if USB packets arrives during transmission of non-USB data, previously accumulated when no USB traffic is present, the RF hub will not be able to transmit the USB packets immediately, resulting in unacceptably slowed USB communications if not an outright loss of data.

Accordingly there is a need for an improved multi-protocol network including both USB and non-USB protocols capable of wireless communication over a RF link using a USB interface and control methodology for operating the same.

SUMMARY

A multi-protocol network using Universal Serial Bus (USB) and wireless protocols, and methods and control methodology for operating the same are provided. The method begins with establishing a wireless-connection between a first device including a first transceiver and a first interface-controller coupled to a first wired-connection, and a second device including a second-transceiver and a second interface-controller coupled to a second wired-connection using a packet-switched-wireless-protocol. Next, data including first-packets and non-packet based data to be transmitted through the wireless-connection is received from the first wired-connection, and converted to second-packets compatible with the packet-switched-wireless-protocol by inserting a number of synchronization bits in a preamble field of the first-packets to align a packet duration of the second-packets with a packet duration of packets of the packet-switched-wireless-protocol. The number of synchronization bits include at least some bits of the non-packet based data. Generally, the preparation of the preamble of the second-packets is initiated on sensing the arrival of data and thus lowering the latency of the overall transaction without waiting for the start of the first packet or data packet. The second-packets are then transmitted from the first device to the second device, and converted to third-packets by removing the number of synchronization bits in the preamble field of the second-packets, and coupling the third-packets to the second wired-connection through the second interface-controller.

Latency of packet based data communication is improved by initiating/starting a packet to the wired controller before a data portion of the packet is received. The number of synchronization bits is selected so the second-packets are aligned and synchronized with wireless-protocol packets.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 5 is a flowchart illustrating a method of operating a multi-protocol communication network of FIG. 1 in accordance with exemplary embodiments of the present disclosure.

DETAILED DESCRIPTION

Multi-protocol communication networks including a wired protocol, such as a Universal Serial Bus (USB) protocol, and a wireless protocol, such as a radio frequency (RF) protocol, ultra-wideband (UWB) technology, and millimeter-wave (mmWave) wireless and control methodology for operating the same are disclosed.

In the following description, for purposes of explanation, numerous specific details are set forth in order to provide a thorough understanding of the present invention. It will be evident, however, to one skilled in the art that the present invention can be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein can include both to directly electrically connect two or more components or elements and to indirectly connect through one or more intervening components.

Figure 1:
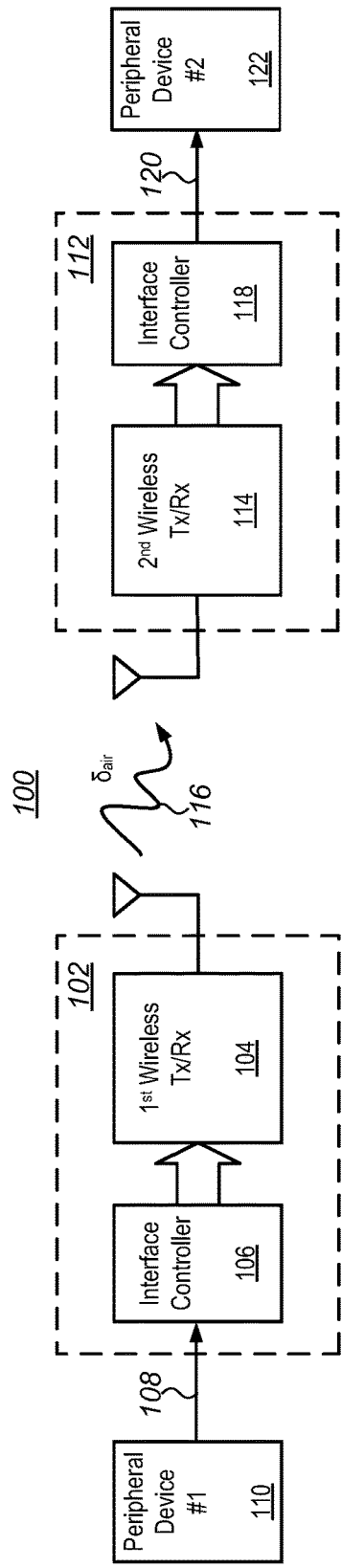
FIG. 1 is a block diagram illustrating a multi-protocol communication network in accordance with exemplary embodiments of the present disclosure.

FIG. 1 is a block diagram illustrating an exemplary embodiment of a multi-protocol communication network capable of implementing a control methodology in accordance with the present disclosure. Referring to FIG. 1 the multi-protocol communication network 100 includes a first device 102, such as a wireless hub or router, including a first transceiver 104 and a first interface-controller 106 coupled through a first wired-connection 108 to a first computer or peripheral device 110 using a packet-switched-wired-protocol. The multi-protocol communication network 100 generally further includes at least a second device 112 including a second-transceiver 114 wirelessly coupled to the first transceiver over a wireless-connection 116 using a packet-switched-wireless-protocol, and a second interface-controller 118 through a second wired-connection 120 to a second computer or peripheral device 122. The first device 102 is operable in a transmission mode to receive first-packets over the first wired-connection 108 using a packet-switched-wired-protocol and to convert the first-packets to second-packets compatible with a packet-switched-wireless-protocol by inserting a number of synchronization bits in a preamble field of the first-packets, and to couple the second-packets to the second-transceiver 114 using the packet-switched-wireless-protocol. The second device 112 is operable in a receive mode to receive the second-packets over the wireless-connection 116; to convert the second-packets to third packets compatible with the packet-switched-wired-protocol by removing the number of synchronization bits in the preamble field of the second-packets; and coupling the third packets to the second wired-connection 120 through the second interface-controller 118 using the packet-switched-wired-protocol.

Generally, inserting the synchronization bits involves determining a packet duration of packets compatible with the packet-switched-wireless-protocol when establishing the wireless-connection or pairing, and inserting a number of synchronization bits so that a duration of the second-packets is aligned with the packet duration of the wireless packets. Transmitting the second-packets to the second-transceiver includes synchronizing a start of the second-packets with a start of packets exchanged between the first transceiver and second-transceiver to establish or maintain the wireless-connection.

Although not shown, it will be understood that the second device 112 can also operate in the transmission mode while the first device 102 can operate in the receive mode. It will be further understood that while only a first device 102 and second device 112 are shown in FIG. 1, a plurality of devices may be provided.

In some embodiments, the packet-switched-wired-protocol is implemented using a Universal Serial Bus (USB) standard or protocol in which the first and third packets are USB packets used to connect the first peripheral device 110 to the first interface-controller 106 via a first USB cable (first wired-connection 108), and to connect the second interface-controller 118 to the second peripheral device 122 via a second USB cable (second wired-connection 120). The USB standard used can include any of the standards specified in existing USB specifications, USB 1.x, USB 2.0, USB 3.x, or USB4, or future generations of USB specifications. Advantageously, the USB standard used is USB 2.0 or later, and includes high speed (HS) USB packets having a data rate of at least 480 megabits per second (Mbit/s). Use of lower data rate packets, such as low speed (LS) and full speed (FS) packets is supported by the multi-protocol communication network 100 of FIG. 1, however doing so may result in longer wireless packets, increasing latencies and reducing power efficiency of the multi-protocol communication network.

The packet-switched-wireless-protocol is generally implemented using a radio frequency (RF) wireless technology standard over, for example, a wireless local area network (WLAN).

Figure 2:
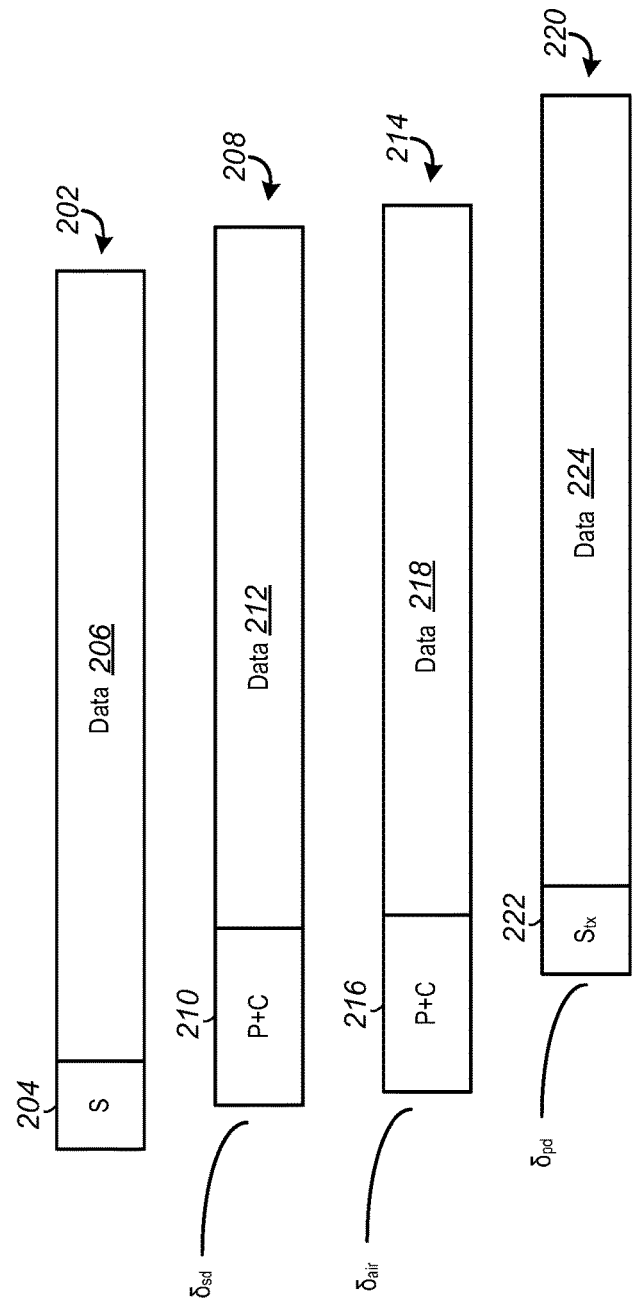
FIG. 2 are schematic block diagrams illustrating RF packets for packet-switched-wireless-protocol in the multi-protocol communication network of FIG. 1 when operated in accordance with exemplary embodiments of the present disclosure.

FIG. 2 illustrates schematic block diagrams of packets for packet-switched-wireless-protocol in the multi-protocol communication network of FIG. 1 when operated in accordance with exemplary embodiments of the present disclosure. Referring to FIG. 2 packet 202 represents a first wired protocol packet, such as a USB packet, received in the first interface-controller 106. The first wired protocol packet 202 includes a preamble field 204 at the beginning including a number of bits used for synchronizing wired communication between a $1^{st}$ device, such as the first peripheral device 110, and a host, such as the first interface-controller 106, followed by a data field 206 capable of transmitting multiple bytes of data. Where the first wired protocol packet 202 is a USB packet the wired protocol packet can include any one of four types of USB packets, including token packets, Data Packets, Handshake Packets, or Start of Frame Packets. Generally, the preamble field 204 includes 4 to 8 bits and the data field 206 can include up to from 512 to 1024 bytes of data.

Packet 208 represents a first wireless protocol packet, such as a RF packet, formed from the insertion of a number of synchronization bits into the preamble field 204 of the first wired protocol packet 202 after a sync-delay $\delta_{sd}$ and the transmitted from the first transceiver 104 to the second transceiver 114. The first wireless protocol packet 208 includes a preamble field 210 at the beginning including a number of bits used for communicating data for a physical layer (P) and media access control (MAC) layer (C), followed by a data field 212 capable of transmitting bytes of data. The sync-delay $\delta_{sd}$ arises from the insertion of from about 4 to about 8 synchronization bits resulting in a delay from 8 to about 16 nanoseconds (ns).

Packet 214 represents a second wireless protocol packet, such as a RF packet or UART packet, received in the second transceiver 114 after an over the air delay $\delta_{air}$ of about 5 ns. The second wireless protocol packet 214 like the first wireless protocol packet 208 includes a preamble field 216 at the beginning including the same P and C bits, followed by a data field 218.

Packet 220 represents a second wired protocol packet, such as a USB packet, formed by the removal of the synchronization bits from the preamble field 216 of the second wireless protocol packet 214 and coupled through the second interface-controller 118 to the second peripheral device 122 over the second wired-connection 120 after a preamble delay $\delta_{pd}$. The preamble delay $\delta_{pd}$ arises from the removal of the synchronization bits from the preamble field 216 and can be from about 8 to about 32 ns. The second wired protocol packet 220 like the first wireless protocol packet 202 includes a preamble field 222 at the beginning including a number of bits used for synchronizing wired communication between the second interface-controller 118 and the second peripheral device 122, followed by a data field 224.

Referring to FIG. 2 it will be understood that the delay times or latencies, $\delta_{sd}$ and $\delta_{pd}$ are minimized proactively starting a preamble transmission and inserting a number of synchronization bits in a preamble field of the first-packets-even before data bits of the packets have arrived.

Figure 3:
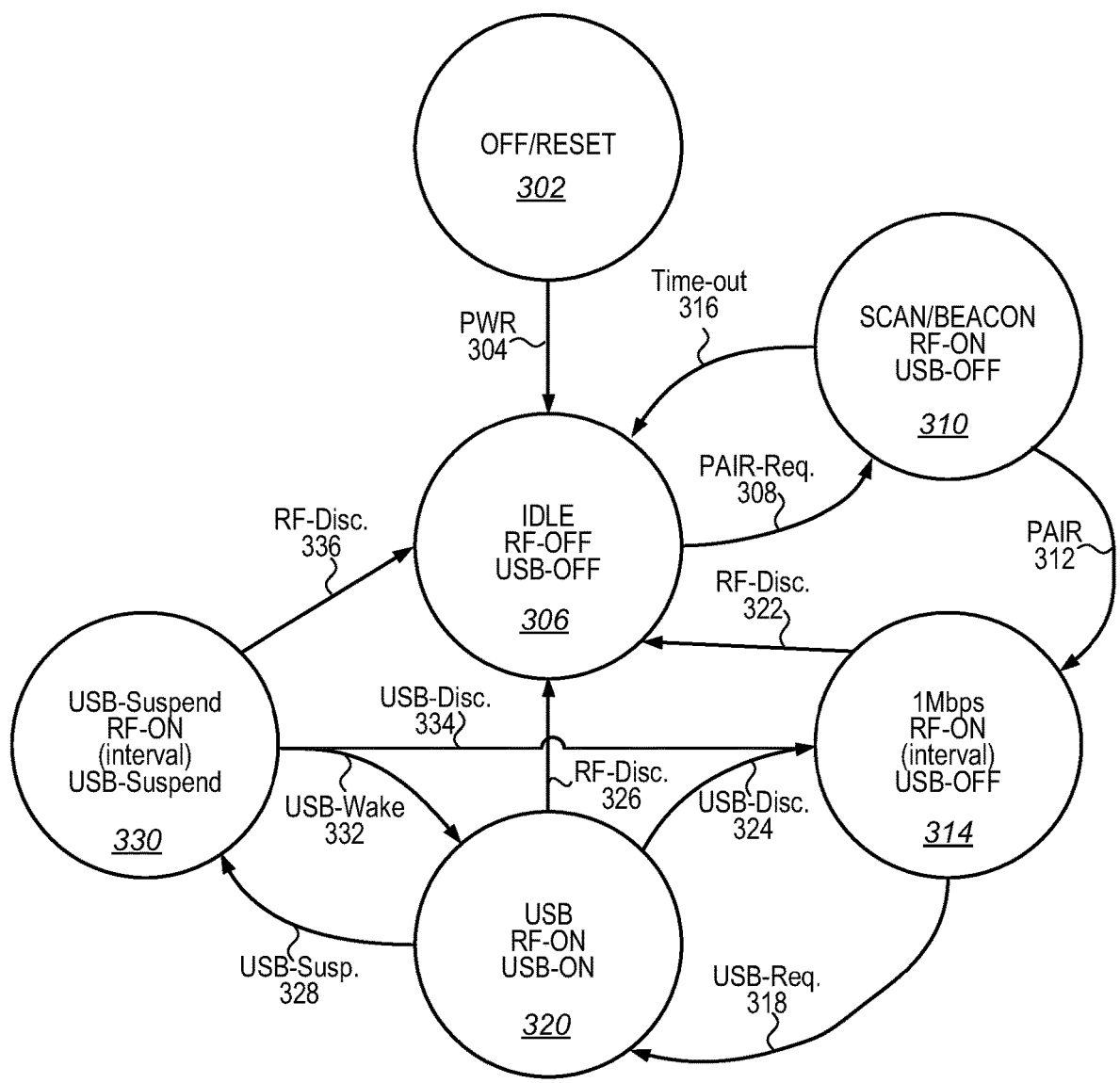
FIG. 3 is a state diagram illustrating exemplary states and transitions between states as part of operation of a multi-protocol communication network in accordance with exemplary embodiments of the present disclosure.

FIG. 3 is a state diagram illustrating exemplary states and transitions between states as part of operation of a multi-protocol communication network in accordance with exemplary embodiments of the present disclosure. Referring to FIG. 3 the method begins with one or both of the devices, i.e., the first device 102 and second device 112 of the multi-protocol communication network 100 in an off or reset state 302. In a first transition power (PWR 304) is applied to both of the first and second devices bringing the multi-protocol communication network 100 to an idle state 306 in which both the interface-controllers 106 and 118 (USB) and the transceivers 104 and 114 (RF) are OFF, that is not exchanging packets or communicating. Next, the first transceiver 104 sends a pairing request (PAIR-Req. 308) to the second transceiver 114 bringing the multi-protocol communication network 100 to a SCAN/BEACON 310 state in which the RF is ON while the USB is OFF. If the second transceiver 114 responds to the pairing request (PAIR-Req. 308), the first and second devices are paired (PAIR 312) and exchange RF packets at a predetermined data rate, shown here as 1 Mbs, establishing RF communication, and the multi-protocol communication network 100 enters an RF-ON USB-OFF state 314 for a predetermined interval. If no response is received in response to the pairing request after a predetermined time-out 316 the multi-protocol communication network returns to the idle state 306.

Next, a USB-enable handshake or request (USB-Req. 318) is initiated by the first interface-controller 106 of the first device 102 sending a USB packet through the first and second transceivers 104, 114, to the second interface-controller 118 bringing the multi-protocol communication network 100 to a USB state 320 in which both USB and RF communication are enabled or ON. In accordance with the methodology of the present disclosure the USB packet is converted or translated to a RF packet compatible with an RF portion of the multi-protocol communication network 100 by the insertion of synchronization bits into a preamble field of the USB packet so that a duration of the RF packets is aligned with packet duration of RF packets previously used to establish RF communication. Generally, the conversion is accomplished proactively by sensing a beginning of reception of the USB packet and starting a preamble transmission by inserting the number of synchronization bits in the preamble field without waiting for receipt of a data portion of a first one of the first-packets. The number of synchronization bits can include bits of the non-packet based data received or accumulated in the first device and the second device. Thus, in some embodiments the first and second device are operable to buffer non-packet based data sufficient to enable a slowest RF packet rate dictated by a USB packet rate.

If no USB-enable handshake (USB-Req. 318) is initiated within the predetermined interval the RF communication, i.e., the exchange of RF packets is discontinued or the RF is disconnected (RF-Disc. 322) and the multi-protocol communication network 100 returns to the idle state 306.

If the USB-enable handshake (USB-Req. 318) is initiated but no response is received the USB communication is discontinued or the USB is disconnected (USB-Disc. 324) and the multi-protocol communication network 100 returns to the RF-ON USB-OFF state 314 for at least the predetermined interval, actively 'listening' for a USB-enable handshake (USB-Req. 318).

After establishing USB communication with the multi-protocol communication network 100 in the USB state 320 the network will continue communication, exchanging USB packets aligned and synchronized with RF packets. If the RF communication is interrupted or disconnected (RF-Disc. 326) the multi-protocol communication network 100 returns to the idle state 306.

If USB communication is interrupted or suspended (USB-Susp. 328) the multi-protocol communication network 100 will enter a USB-suspended state 330 in which the RF communication is ON, while the USB communication is suspended or asleep. If further USB packets are received the USB interface-controllers 106, 118, are awakened (USB-Wake 332), and the multi-protocol communication network 100 return to the USB state 320 exchanging USB packets aligned and synchronized with RF packets.

If no USB packets are received after the predetermined USB communication is disconnected (USB-Disc. 334) and the multi-protocol communication network 100 returns to the RF-ON USB-OFF state 314 for at least, actively 'listening' for a USB-enable handshake (USB-Req. 318).

Alternatively, if the RF communication is interrupted or disconnected (RF Disc. 336) the multi-protocol communication network 100 returns to the idle state 306.

It will be understood that because the transmission and reception of the wired and wireless packets is substantially pipelined, with the transmission of one wireless packet immediately following a previous packet, and without the need to buffer an entire wired or wireless packet, the methodology of the present disclosure provides substantial decrease overall latency in data communication, reduces a complexity of the wireless hub or router (first device 102 or second device 112), and increases power efficiency of the multi-protocol communication network 100 by reducing the time the multi-protocol communication network must remain powered while effectively idled.

Figure 4:
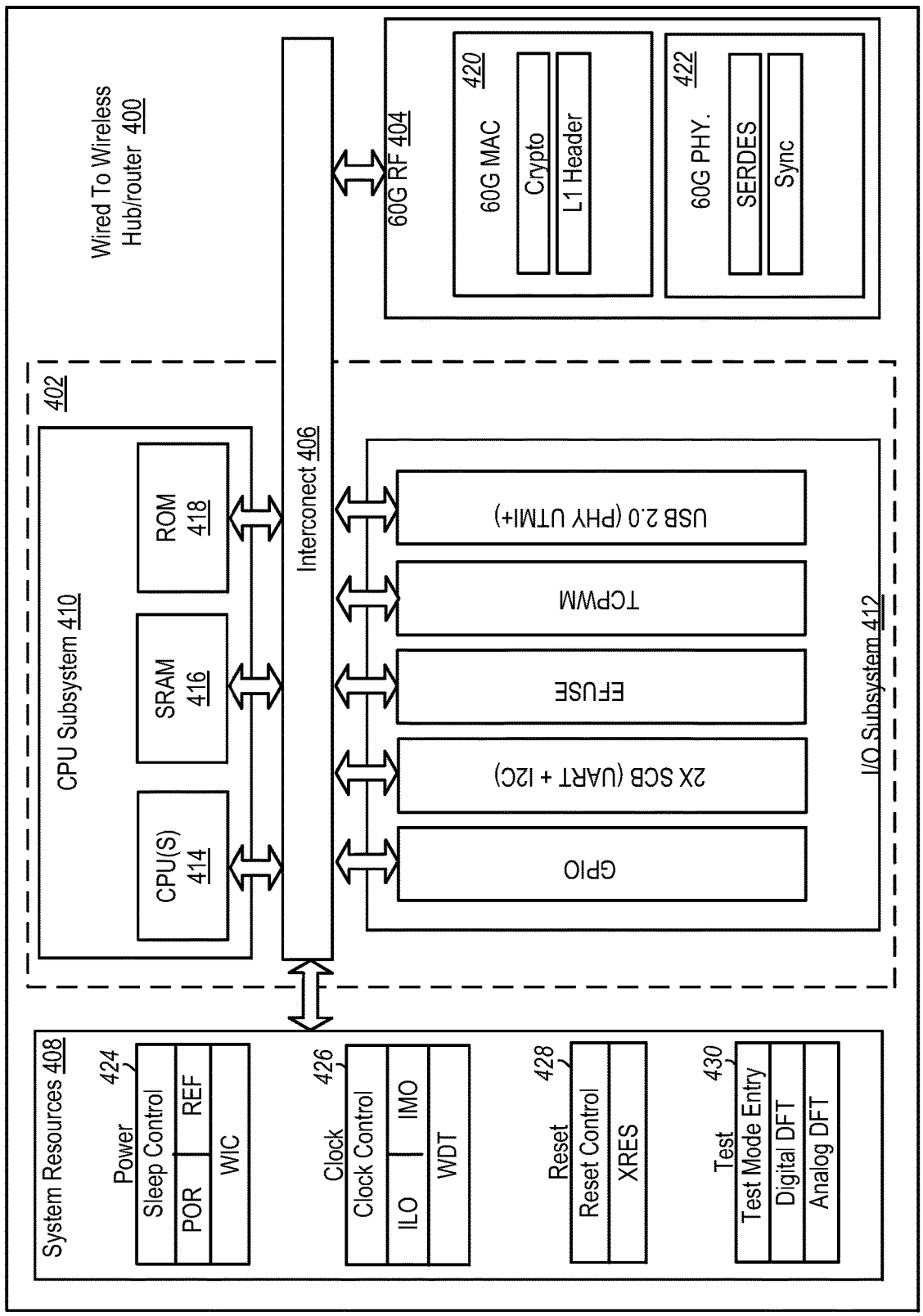
FIG. 4 is a block diagram of a wired to wireless hub or router suitable for use in a multi-protocol communication network and capable of implementing a control methodology in accordance with exemplary embodiments of the present disclosure.

FIG. 4 is a block diagram of a wired to wireless hub or router suitable for use as the first device 102 or second device 112 in the multi-protocol communication network 100 of FIG. 1, and capable of implementing a control methodology in accordance with exemplary embodiments of the present disclosure. Referring to FIG. 4, in the embodiment shown the wired to wireless hub/router 400 includes a USB interface 402, a transceiver, such as a 60 GHz RF radio 404, a system and peripheral interconnect 406, and additional system resources 408.

The USB interface 402 generally includes a central processing units (CPU) subsystem 410, and an input/output (I/O) subsystem 412. The CPU subsystem 410 includes one or more CPUs 414, Static Random Access Memory (SRAM 416), and Read Only Memory (ROM 418) all coupled through the interconnect 406. The CPU(s) 414 can include any suitable processor capable of operating the wired to wireless hub/router 400. The SRAM 416 is a fast, non-volatile memory (e.g., NAND flash, NOR flash, etc.) having shorter access or read times that is configured for storing data and instructions accessed by the CPU(s) 414. The ROM 418 can include an embedded non-volatile memory (eNVM) that is configured for storing boot-up routines, configuration parameters, and other firmware parameters and settings.

The I/O subsystem 412 of the USB interface 402 can include various different types of I/O blocks, timer/counter/pulse-width-modulation (TCPWM) blocks, and various sub-circuits or blocks. The I/O blocks can include, for example, general purpose input output blocks subsystems (GIPOs); two or more serial communication blocks (2×SCBs), each capable of providing a digital interface such as a UART or an Inter-Integrated Circuit (I2C) interface; and a USB physical layer interface, such as a USB Transceiver Macrocell Interface (UTMI) interface (PHY UTMI+), Other sub-circuits or blocks can include one or more electronic fuse circuits (EFUSE) to enable in-chip programming or tuning of the USB interface 402 and/or wired to wireless hub/router 400.

The interconnect 406 can include a single-level Advanced High-Performance Bus (AHB) or system bus that is configured as an interface that couples the various components of the USB interface 402 to each other, as well as function as a data and control interface between the RF radio 404 and other system resources 408 of the wired to wireless hub/router 400.

The RF radio 404 can include, in addition to an electronic oscillator to generate an RF signal and modulator/de-modulator to add or extract information from the RF signal, a Medium Access Control layer (MAC 420) and a physical layer (PHY. 422) The MAC 420 can include a crypto block or subsystem, and a L1 Header block or subsystem. The physical layer (PHY. 422) can include a serializer/deserializer (SERDES) block or subsystem to convert data between serial data and parallel interfaces, and sync-block or subsystem.

The system resources 408 can include various electronic circuits and subsystems to support various states and modes of operation of the wired to wireless hub/router 400. For example, the system resources 408 can include a power subsystem (Power 424) including analog and/or digital circuits such as sleep control circuits, a wake-up interrupt controller (WIC), a power-on-reset (POR), voltage and/or current reference generators or circuits (REF). The system resources 408 can also include a clock subsystem (Clock 426) having analog and/or digital circuits such as, for example, clock control circuits, watchdog timer (WDT) circuit(s), internal low-speed oscillator (ILO) circuit(s), and internal main oscillator (IMO) circuit(s). The system resources 408 can further include analog and/or digital circuit reset circuits 428 that provide reset control and support external reset (XRES). In some embodiments, such as that shown, the system resources 408 can include a test subsystem (test 430), including various test circuits or blocks for test mode entry and analog and/or digital design-for-testability (DFT) operations.

A method of operating a multi-protocol communication network will now be described with reference to FIG. 5. Referring to FIG. 5 the method begins with establishing a wireless-connection between a first device including a first transceiver and a first interface-controller coupled to a first wired-connection, and a second device including a second-transceiver and a second interface-controller coupled to a second wired-connection using a packet-switched-wireless-protocol (step 502). Generally, as noted above establishing the wireless-connection includes determining a packet duration of packets compatible with the packet-switched-wireless-protocol. Next, data is received in a first interface-controller in the first device from the first wired-connection, the data including first-packets and non-packet based data to be transmitted through the wireless-connection (step 504). The first-packets received using the packet-switched-wired-protocol are converted to second-packets compatible with the packet-switched-wireless-protocol by proactively starting a preamble transmission and inserting a number of synchronization bits in a preamble field of the first-packets to align a packet duration of the second-packets with a packet duration of packets of the packet-switched-wireless-protocol, wherein the number of synchronization bits include bits of the non-packet based data (step 506). As noted above, the synchronization bits can also include commas inserted into the preamble, instead of or in addition to bits of the non-packet based data where necessary so that a duration of the converted second-packets is aligned with a packet duration of packets compatible with the packet-switched-wireless-protocol. Next, the second-packets are then transmitted from the first device to the second device using the packet-switched-wireless-protocol (step 508). Finally, the second-packets received in the second transceiver are converted to third packets compatible with the packet-switched-wireless-protocol by removing the number of synchronization bits in the preamble field of the second-packets, and coupling the third-packets to the second wired-connection through the second interface-controller (step 510).

Optionally, the method can further include while the first interface-controller and second interface-controller are idle accumulating non-packet based UART or PCM data, and exchanging RF packets substantially consisting of the accumulated non-packet based data between the first and second transceiver while the first and second interface-controllers are idle to maintain or 'keep alive' the wireless-connection while packet based (USB) data is not being exchanged (step 512).

Thus, multi-protocol communication networks and methodologies for controlling the same to decrease latency and improve reliability of a wireless-connection, have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections can set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method for operating a multi-protocol communication network comprising:
    transmitting a pairing request (PAIR-Req) from a first transceiver in a first device to a second-transceiver in a second device using a packet-switched-wireless-protocol, the PAIR-Req including first wireless-packets;
    if the second-transceiver responds to the PAIR-Req establishing a wireless-connection between the first transceiver and the second transceiver;
    initiating a USB-connection by sending a universal serial bus (USB) enable request (USB-Req) from a first interface-controller in the first device coupled between a first wired network and the first transceiver, transmitting the USB-Req from the first transceiver to the second transceiver, and sending the USB-Req from the second transceiver to a second interface-controller in the second device coupled between the second transceiver and a second wired network, the USB-Req including USB-packets; and
    if the second device responds to the USB-Req establishing USB communication between the first wired network and the second wired network,
    wherein transmitting the USB-Req from the first transceiver to the second transceiver comprises converting the USB-packets to second wireless-packets having a duration aligned with the first wireless-packets by inserting a number of synchronization bits in a preamble field of the USB-packets.

2. The method of claim 1 wherein sending the USB-Req from the second transceiver to the second interface-controller comprises re-converting the second wireless-packets received in the second device to USB-packets by removing the number of synchronization bits in the preamble field.

3. The method of claim 1 wherein the number of synchronization bits includes bits of non-packet based data accumulated in the first device to be transmitted through the wireless-connection.

4. The method of claim 3 wherein the non-packet based data comprises Universal Asynchronous Receiver-Transmitter (UART) or Pulse-code Modulation (PCM) data.

5. The method of claim 3 further comprising if communication of USB-packets between the first wired network and the second wired network is suspended, idling the first interface-controller and the second interface-controller, and transmitting third wireless-packets comprising accumulated non-packet based data to maintain the wireless-connection.

6. The method of claim 5 further comprising if USB-packets are received in the first interface-controller from the first wired network or in the second interface-controller from the second wired network, awakening the first interface-controller and the second interface-controller, and establishing USB communication between the first wired network and the second wired network.

7. The method of claim 5 further comprising if communication of USB-packets between the first wired network and the second wired network is suspended for a first predetermined time, resending the USB-Req from the first interface-controller through the wireless-connection to the second interface-controller.

8. The method of claim 7 further comprising if the second device does not respond to the USB-Req within a second predetermined time, idling the first transceiver and the second transceiver.

9. The method of claim 8 further comprising after the first transceiver and the second transceiver have been idled for a third predetermined time, re-transmitting the PAIR-Req from the first transceiver to the second-transceiver, and, if the second-transceiver responds to the PAIR-Req, establishing wireless-connection between the first transceiver and the second transceiver and re-initiating the USB-connection.

10. The method of claim 5 further comprising if the wireless-connection between the first transceiver and the second transceiver is interrupted for a first predetermined time, idling the first transceiver and the second transceiver.

11. The method of claim 10 further comprising after the first transceiver and the second transceiver have been idled for a second predetermined time, re-transmitting the PAIR-Req from the first transceiver to the second-transceiver, and, if the second-transceiver responds to the PAIR-Req, establishing wireless-connection between the first transceiver and the second transceiver and re-initiating the USB-connection.

12. The method of claim 1 wherein converting the USB-packets to second wireless-packets comprises sensing reception of a first USB-packet, inserting the number of synchronization bits in a preamble field of the first USB-packet, and beginning transmission of the preamble field of the first USB-packet without waiting for receipt of a data portion of the first USB-packet.

* * * * *